United States Patent
Yoshida et al.

(10) Patent No.: US 11,982,777 B2
(45) Date of Patent: May 14, 2024

(54) RADIATION POSITION DETECTOR

(71) Applicant: NATIONAL INSTITUTES FOR QUANTUM SCIENCE AND TECHNOLOGY, Chiba (JP)

(72) Inventors: Eiji Yoshida, Chiba (JP); Taiga Yamaya, Chiba (JP)

(73) Assignee: NATIONAL INSTITUTES FOR QUANTUM SCIENCE AND TECHNOLOGY, Chiba (JP)

( * ) Notice: Subject to any disclaimer, the term of this patent is extended or adjusted under 35 U.S.C. 154(b) by 271 days.

(21) Appl. No.: 17/619,962

(22) PCT Filed: Jun. 26, 2020

(86) PCT No.: PCT/JP2020/025134
§ 371 (c)(1),
(2) Date: Dec. 16, 2021

(87) PCT Pub. No.: WO2021/006061
PCT Pub. Date: Jan. 14, 2021

(65) Prior Publication Data
US 2022/0357467 A1   Nov. 10, 2022

(30) Foreign Application Priority Data
Jul. 8, 2019   (JP) .................. 2019-126957

(51) Int. Cl.
*G01T 1/164*   (2006.01)
*G01T 1/20*   (2006.01)
*G01T 1/29*   (2006.01)

(52) U.S. Cl.
CPC .......... *G01T 1/1644* (2013.01); *G01T 1/2002* (2013.01); *G01T 1/2985* (2013.01)

(58) Field of Classification Search
CPC ... G01T 1/1644; G01T 1/2002; G01T 1/2985; G01T 1/1642
See application file for complete search history.

(56) References Cited

U.S. PATENT DOCUMENTS

| | | | |
|---|---|---|---|
| 2011/0192982 A1 | 8/2011 | Henseler et al. | |
| 2013/0056638 A1* | 3/2013 | Inadama ............... | G01T 1/1644 250/362 |

(Continued)

FOREIGN PATENT DOCUMENTS

| | | |
|---|---|---|
| JP | H06-51069 A | 2/1994 |
| JP | 2003-240857 A | 8/2003 |

(Continued)

OTHER PUBLICATIONS

Yoshida, E. et al., "Four-layered DOI-PET detector with quadrisected top layer crystals," Nuclear Inst. and Methods in Physics Research, A, vol. 933, pp. 1-7, 2019.

(Continued)

*Primary Examiner* — Kiho Kim
(74) *Attorney, Agent, or Firm* — Oliff PLC (57) ABSTRACT

A radiation position detector includes: a photodetector array constituted of unit-sized unit photodetectors; a scintillator array constituted of a plurality of tetragonal scintillator elements optically connected to the photodetector array, wherein scintillator units are each constituted of a pair of unit scintillators whose individual cross-sectional size of plane facing to right receiving surface is ¼ of the size of the unit photodetector, where at least part of which is optically connected on a surface side opposite to the right receiving surface, the scintillator units being each arranged so as to be positioned over two of the unit photodetectors; and a position evaluation unit configured to identify the scintillator unit by the presence or absence of a signal and furthermore identify one of the unit scintillators of the scintillator unit on (Continued)

the basis of a strength of the signal, to obtain a two-dimensional radiation detection position.

6 Claims, 13 Drawing Sheets

(56) References Cited

U.S. PATENT DOCUMENTS

| | | | |
|---|---|---|---|
| 2015/0028218 A1 | 1/2015 | Kataoka et al. | |
| 2015/0226862 A1 | 8/2015 | Lewellen et al. | |
| 2016/0223686 A1 | 8/2016 | Uchida et al. | |
| 2016/0223690 A1 | 8/2016 | Uchida | |
| 2017/0234990 A1 | 8/2017 | Sowards-Emmerd et al. | |
| 2018/0284297 A1 | 10/2018 | Nakazawa et al. | |
| 2018/0364372 A1* | 12/2018 | Furumiya | G01T 1/2985 |

FOREIGN PATENT DOCUMENTS

| | | |
|---|---|---|
| JP | 2009-53104 A | 3/2009 |
| JP | 2013-140024 A | 7/2013 |
| JP | 2013-246156 A | 12/2013 |
| JP | 2016-017851 A | 2/2016 |
| JP | 2016-145819 A | 8/2016 |
| JP | 2017-072573 A | 4/2017 |
| WO | 2017/046928 A1 | 3/2017 |

OTHER PUBLICATIONS

May 15, 2023 extended Search Report issued in European Patent Application No. 20836254.1.

Sep. 8, 2020 International Search Report issued in International Patent Application No. PCT/JP2020/025134.

W.W.Moses, et al., "Performance of a PET detector module utilizing an array of silicon photodiodes to identify the crystal of interaction", IEEE Trans. Nucl. Sci. vol. 40, 1036-1040, 1993.

H.Uchida, et al. "A novel single-ended readout depth-of-interaction PET detector fabricated using sub-surface laser engraving", Phy. Med. Bio., 61(2016)6635.

Zhang. et al "A depth encoding PET detector using four-crystals-to-one-SiPM coupling and light-sharing window method" Medical Physics, https://aapm.onlinelibrary.wiley.com/doi/full/10.1002/mp.13603, May 20, 2019.

* cited by examiner

RADIATION POSITION DETECTOR

TECHNICAL FIELD

The present invention relates to a radiation position detector, and in particular, to a radiation position detector suitable for use in the field of nuclear medicine imaging, such as for positron imaging devices or positron emission tomography (PET) devices.

BACKGROUND ART

In PET, a radiation position detector, in which scintillators and photodetectors are optically connected, is used to detect gamma rays of 511 keV. Therefore, the cross-sectional size of the scintillator relative to the incident plane greatly affects the image quality. In addition, the thickness of the scintillator is approximately 3 cm, in which this thickness lowers image quality in detecting obliquely incident gamma rays. To solve this problem, many three-dimensional PET detectors have been developed that can detect the depth positions at which the scintillators and the gamma rays interact.

Figure 1:
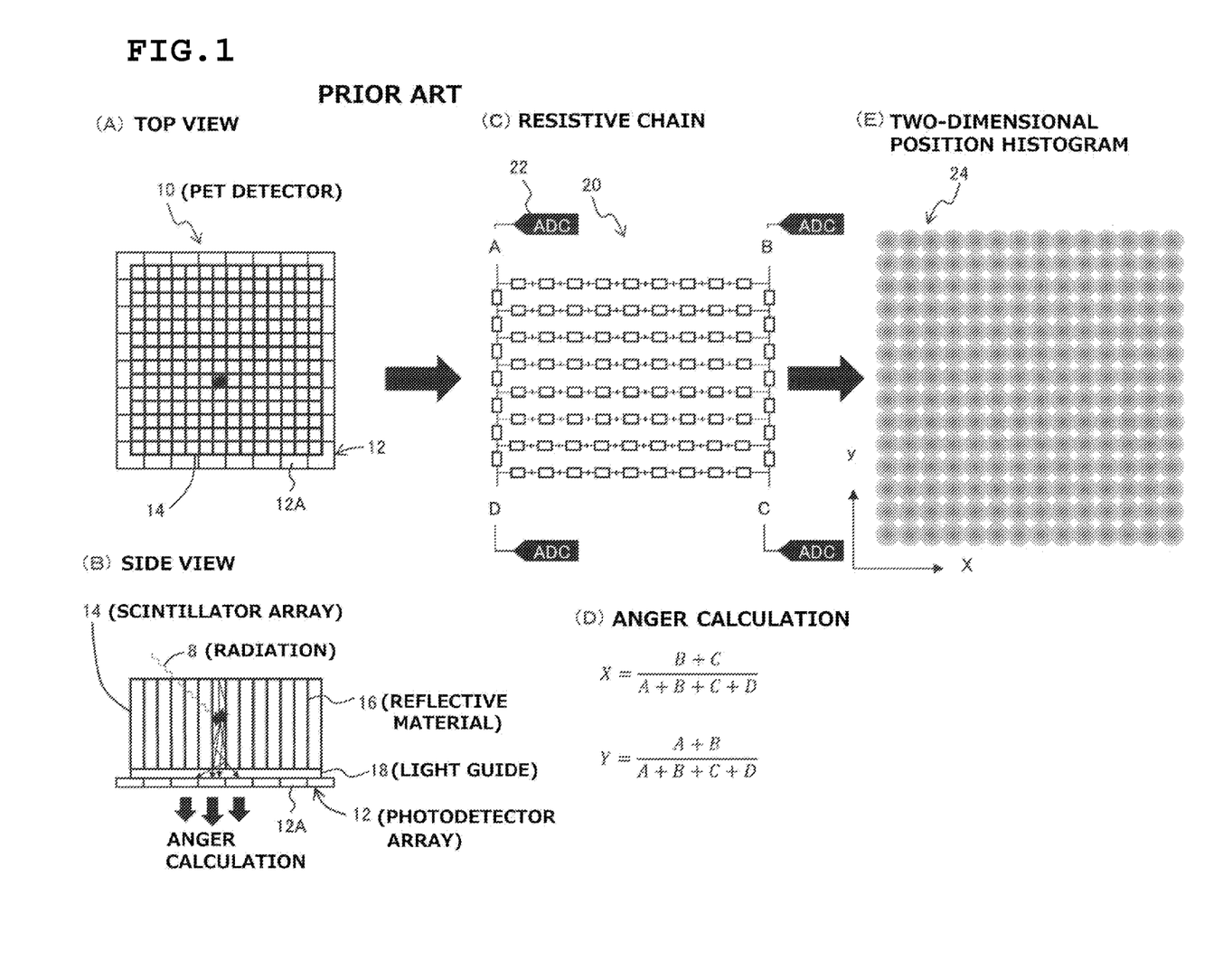
FIG. 1 includes drawings illustrating an example of a configuration of a conventional general PET detector.

FIG. 1 illustrates an example of a general PET detector. This PET detector 10 includes a scintillator array 14 optically connected to a light receiving surface of a photodetector array 12. In the drawing, reference numeral 8 indicates radiation, 12A indicates a photodetector, 16 indicates a reflective material, 18 indicates a light guide for diffusing light, 20 indicates a resistive chain, 22 indicates an analog-to-digital converter (ADC), and 24 indicates a two-dimensional position histogram.

In such a PET detector, the anger calculation (FIG. 1(D)) as described in Patent Literature 1, for example, is used to simplify signal processing. However, in this case, an error occurs in the process of the calculation. In addition, the distribution of light is restricted at the peripheral sections of the scintillator array 14, so that the performance of scintillator identification is degraded in the case of using minute scintillators.

Figure 2:
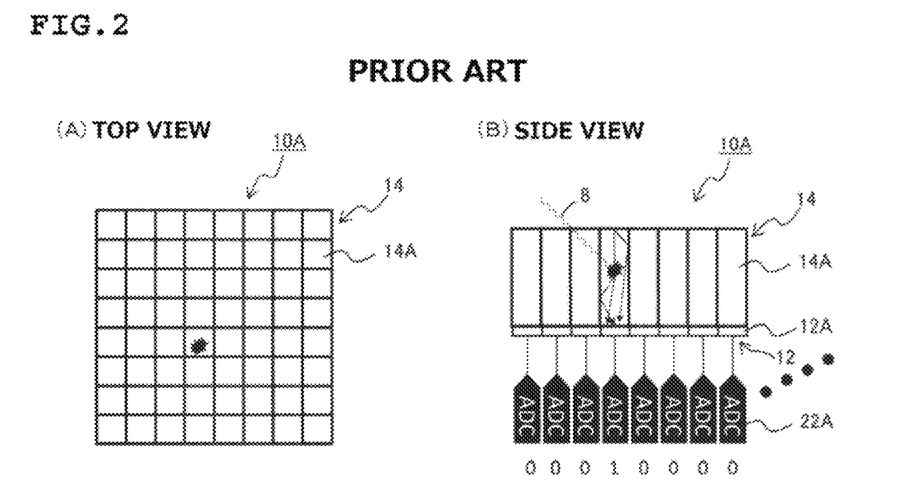
FIG. 2 includes drawings illustrating an example of a configuration of a conventional general digital PET detector.

On the other hand, as illustrated in FIG. 2, a digital PET detector 10A is also used in which unit scintillators 14A, unit photodetectors 12A, and ADCs 22A have a one-to-one coupling. However, the size of the scintillator array 14 is limited to the same size as the photodetector array 12, and a signal processing circuit (ADC 22A) also needs to be prepared for each unit photodetector 12A.

On the other hand, for a three-dimensional PET detector that can also detect positions in a depth direction, there are proposed a method of stacking two types of scintillator arrays with different characteristics as described in Patent Literature 2, a method of optically connecting photodetectors to upper and lower surfaces to utilize an output ratio as described in Patent Literature 3, and a method of optimizing arrangements of optical reflector materials and scintillators for each layer for identification for the anger calculation as described in Patent Literature 4. In addition, Non-Patent Literature 1 proposes a method of depth detection on the basis of an output ratio by optically connecting photodetectors to the upper and lower surfaces of a digital PET detector. Furthermore, as described in Patent Literatures 5 and 6 and Non-Patent Literature 2, a three-dimensional digital PET detector is also proposed in which, in order to reduce the number of photodetectors, pairs of scintillators are each disposed so as to be positioned over a pair of photodetectors where the light path is controlled. This allows depth identification using only the photodetectors on a bottom surface.

In addition, Non-Patent Literature 3 describes assigning four scintillators to a single photodetector.

CITATION LIST

Patent Literature

Patent Literature 1: Japanese Patent Application Laid-Open No. 2013-246156
Patent Literature 2: Japanese Patent Application Laid-Open No. 2016-17851
Patent Literature 3: Japanese Patent Application Laid-Open No. 2013-140024
Patent Literature 4: Japanese Patent Application Laid-Open No. 2009-53104
Patent Literature 5: Japanese Patent Application Laid-Open No. 2016-145819
Patent Literature 6: Japanese Patent Application Laid-Open No. 2017-72573

Non-Patent Literature

Non-Patent Literature 1: W. W. Moses, et al., "Performance of a PET detector module utilizing an array of silicon photodiodes to identify the crystal of interaction", IEEE Trans. Nucl. Sci. Vol 40, 1036-1040, 1993.
Non-Patent Literature 2: H. Uchida, T. Sakai, H. Yamauchi, K. Hakamata, K. Shimizu, "A novel single-ended readout depth-of-interaction PET detector fabricated using sub-surface laser engraving", Phy. Med. Bio., 61(2016)6635
Non-Patent Literature 3: Zhang. et. al "A depth encoding PET detector using four-crystals-to-one-SiPM coupling and light-sharing window method" Medical Physics, https://aapm.onlinelibrary.wiley.com/doi/full/10.1002/mp.13603, 20 May 2019

SUMMARY OF INVENTION

Technical Problem

The general PET detector illustrated in FIG. 1 is constituted of the minute scintillators (14) and a small number of photodetectors 12A, which enables efficient detection, but introduces an error in the process of analog calculation. On the other hand, as illustrated in FIG. 2, the digital PET detector that does not generate a calculation error by making a 1:1 correspondence between the unit scintillator 14A and the photodetector 12A has been developed. However, the size of the scintillators is limited by the size of the unit photodetectors, and an arithmetic circuit (e.g., ADC 22A) is also required for each photodetector 12A.

Also, the radiation position detector described in Non-Patent Literature 2 is configured in a manner such that 4 or 16 blocks of 4×4 unit scintillators correspond to a 2×2 or 8×8 photodetector array, and its specific configuration including the fact that the scintillator array has only one stage differs from that of the present invention.

The present invention aims to solve the above-mentioned conventional problems, an object of the present invention is to provide a radiation position detector that can not only perform identification without causing a calculation error but also acquire depth information, even in the case where the size of the scintillator is smaller than the size of the photodetector.

Solution to Problem

To solve the above-described problems, the present invention is a radiation position detector, where a scintillator is optically connected to alight receiving surface of a photodetector, in which a response of a scintillator element detecting radiation is identified on the light receiving surface to obtain a radiation detection position. The radiation position detector includes: a photodetector array constituted of unit-sized unit photodetectors arranged on a two-dimensional plane; a scintillator array constituted of a plurality of tetragonal scintillator elements optically connected to the photodetector array, wherein scintillator units are each constituted of a pair of unit scintillators whose individual cross-sectional size of plane facing to right receiving surface is ¼ of the size of the unit photodetector, where at least part of which is optically connected on a surface side opposite to the right receiving surface and the rest is isolated with a reflective material, the scintillator units being each arranged so as to be positioned over two of the unit photodetectors in the scintillator array; and a position evaluation unit configured to identify the scintillator unit by presence or absence of a signal at each of the photodetectors and furthermore identify one of the unit scintillators of the scintillator unit on the basis of a strength of the signal, in a case in which the signal is present, to obtain a two-dimensional radiation detection position.

Here, the scintillator units can be arranged so as to be positioned over the unit photodetector and one of four adjacent photodetectors thereto.

Also, a detection depth can be identified from an output ratio of the photodetectors corresponding to the scintillator unit.

The unit scintillator can be identified two dimensionally using anger calculations.

The unit scintillator can be pixelated also in a detection depth direction.

A plurality of stages of two-dimensional scintillator arrays are provided in the detection depth direction, and the number of scintillator units constituting the two-dimensional scintillator array on a radiation incident side can be made smaller than the number of scintillator units constituting the two-dimensional scintillator array on a photodetector array side.

Advantageous Effect of Invention

According to the present invention, the size of the scintillator, i.e. spatial resolution (e.g. 4 mm), can be reduced to ½ (e.g. 2 mm) of the size of the unit photodetector without incurring large costs. Therefore, provided that the size of the unit photodetector is the same as that of a conventional unit photodetector, the spatial resolution of the digital detector can be improved by increasing the number of the unit scintillators. Alternatively, provided that the number of the unit scintillators is the same as that of conventional unit scintillators (the size is small), the size of the unit photodetector can be halved to make the digital detector smaller, which can be used for a helmet-type PET for the human brain or a PET for small animals.

Furthermore, in the case of applying anger calculations to this detector, the distribution of the individual scintillators, also containing detection depth information, is projected locally in the form of a line, thereby greatly reducing calculation errors at a low cost.

DESCRIPTION OF EMBODIMENTS

The present invention will hereinafter be described in detail with reference to the drawings. It should be noted that the present invention is not limited by contents described in the following embodiment and examples. In addition, components in the embodiment and examples described below include those that can be easily assumed by a person skilled in the art, those that are substantially the same, and those that are within a so-called equivalent range. Further, the components disclosed in the embodiment and examples described below may be combined, or selectively used, as appropriate.

Figure 3:
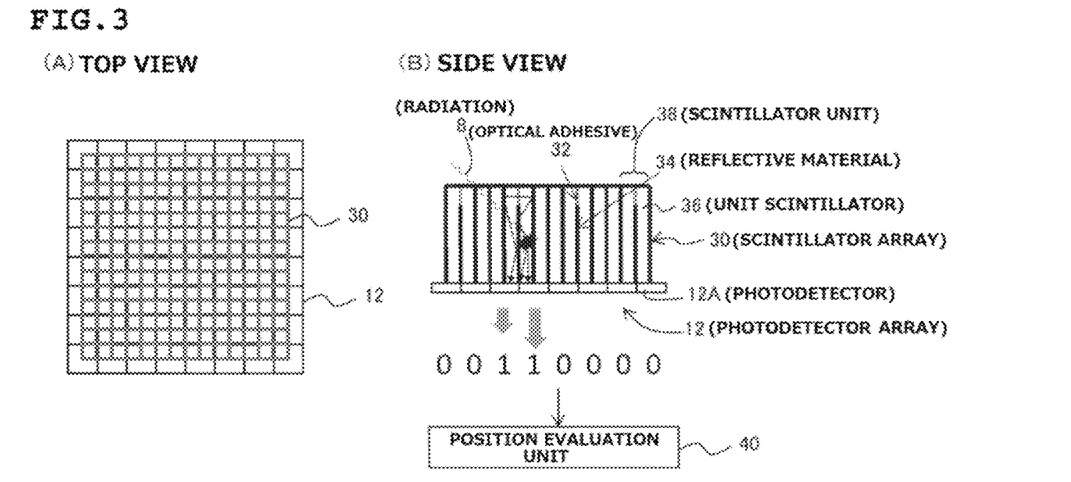
FIG. 3 includes drawings illustrating an embodiment of the present invention.

As illustrated in (A) the top view and (B) the side view of FIG. 3, an embodiment of the present invention is a digital PET detector being a radiation position detector, where a scintillator is optically connected to a light receiving surface of a photodetector, in which a response of a scintillator element detecting radiation is identified on the light receiving surface to obtain a radiation detection position. The digital PET detector includes: a photodetector array 12 constituted of unit-sized approximately rectangular photodetectors (simply referred to as photodetectors) 12A tightly arranged on a two-dimensional plane; a scintillator array 30 constituted of a plurality of scintillator elements (also referred to as unit scintillators) 36 optically connected to the photodetector array 12, wherein scintillator units 38 are each constituted of a pair of unit scintillators 36 whose individual incident surface's cross-sectional size is ¼ (pitch is ½) of the size of the photodetector 12A, where a part of which is optically connected with an optical adhesive 32 on an incident surface side and the rest is isolated with a reflective material (e.g., polytetrafluoroethylene) 34, the scintillator units 38 being each arranged so as to be positioned over the two photodetectors 12A in the scintillator array 30; and a position evaluation unit 40 configured to identify the scintillator unit 38 by the presence or absence of a signal at each of the photodetectors 12A and furthermore identify one of the unit scintillators 36 of the scintillator unit 38 on the basis of the strength of the signal, in a case in which the signal is present, to obtain a two-dimensional radiation detection position.

The scintillator can be composed of, for example, GAGG, LFS, LYSO, or the like, and the photodetector array 12 can be composed of, for example, semiconductor photodetectors such as MPPC, SiPM, or the like.

Since a scintillator that has a size of ¼ the size of the photodetector 12A can be identified. Thus, for example, in the case of using a 4 mm square SiPM, a 2 mm square unit scintillator is used. In the case in which the SiPM array is 8×8, a scintillator array is 14×14 at maximum.

Figure 4:
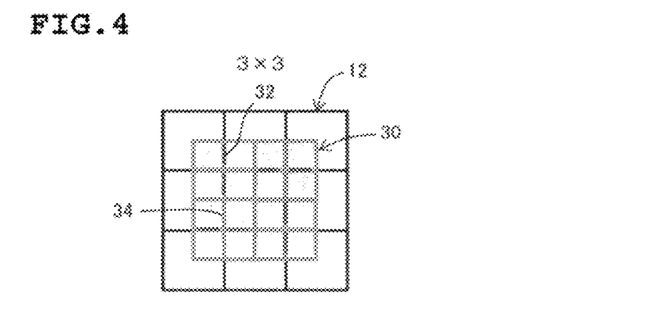
FIG. 4 is a top view illustrating a configuration of the embodiment of the present invention in the case of 3×3.

FIG. 4 illustrates an example arrangement of the scintillator array 30 and the photodetector array 12, in a case in which the number of photodetectors is 3×3.

Figure 5:
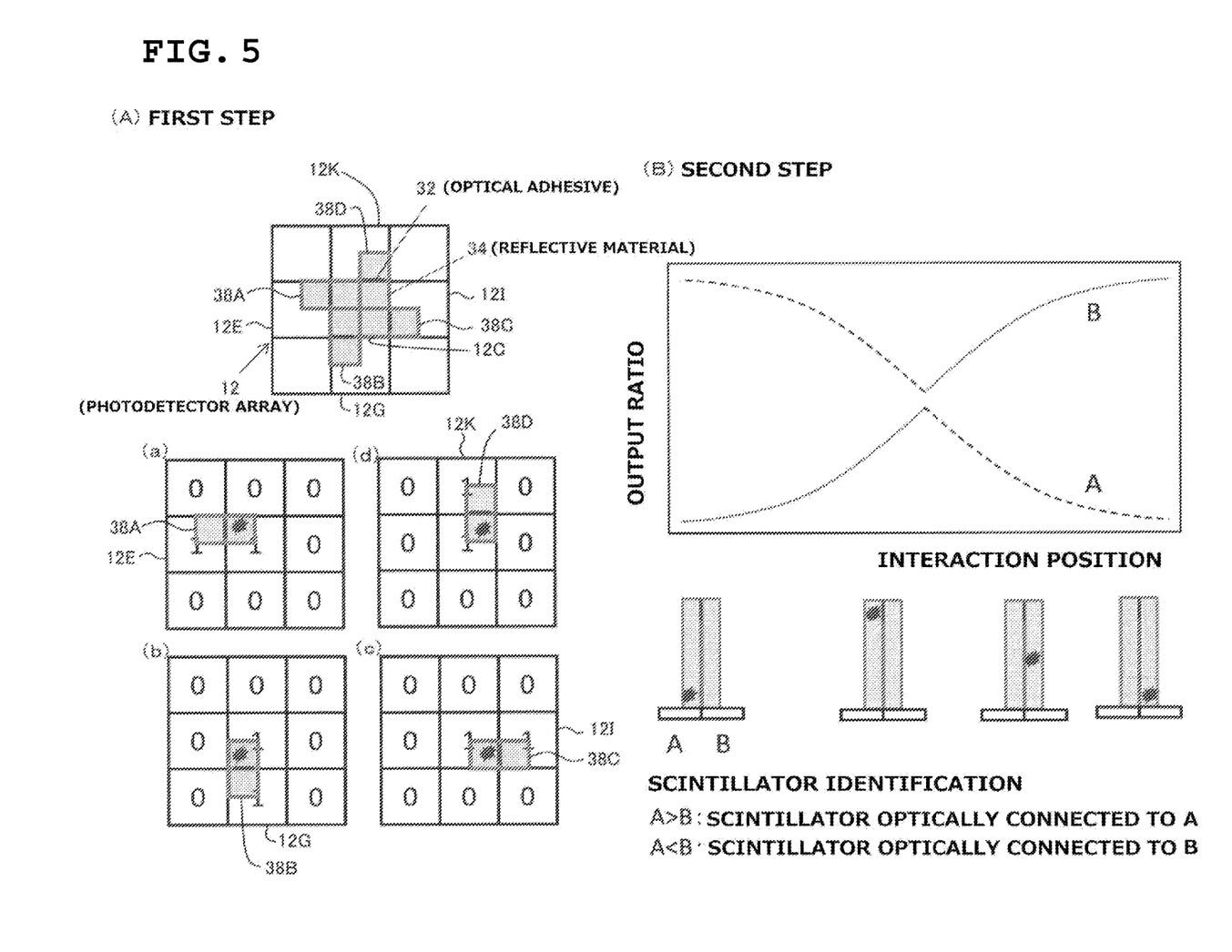
FIG. 5 includes drawings illustrating an example of an arrangement pattern of scintillators relative to a central photodetector and a scintillator identification method at a central portion in the case of 3×3 according to the embodiment of the present invention.

Here, as illustrated in FIG. 5, focusing on the central photodetector 12C, four pairs of scintillator units 38A to 38D, are arranged so as to be positioned over four sides around the central photodetector 12C, respectively. In other words, the scintillator units 38A to 38D are arranged so as to be equally positioned over the central photodetector 12C and each of other photodetectors 12E, 12G, 12I, and 12K adjacent to the four sides thereof, respectively.

As illustrated as a first step in FIG. 5(A), in a case in which radiation is incident on the upper left of the central photodetector 12C, as illustrated in (a), the upper left scintillator unit 38A emits light. In a case in which radiation is incident on the lower left of the central photodetector 12C, as illustrated in (b), the lower left scintillator unit 38B emits light. In a case in which radiation is incident on the lower right of the central photodetector 12C, as illustrated in (c), the lower right scintillator unit 38C emits light. In a case in which radiation is incident on the upper right of the central photodetector 12C, as illustrated in (d), the upper right scintillator unit 38D emits light.

The ratio of output between unit scintillators A and B in each of the scintillator units 38A to 38D varies depending on the incident position on the unit scintillators A and B, as illustrated as a second step in FIG. 5(3). Therefore, the one with a larger output can be identified as the unit scintillator on which radiation has been incident. Furthermore, a position in a depth direction can also be identified by the output ratio between A and B.

Figure 6:
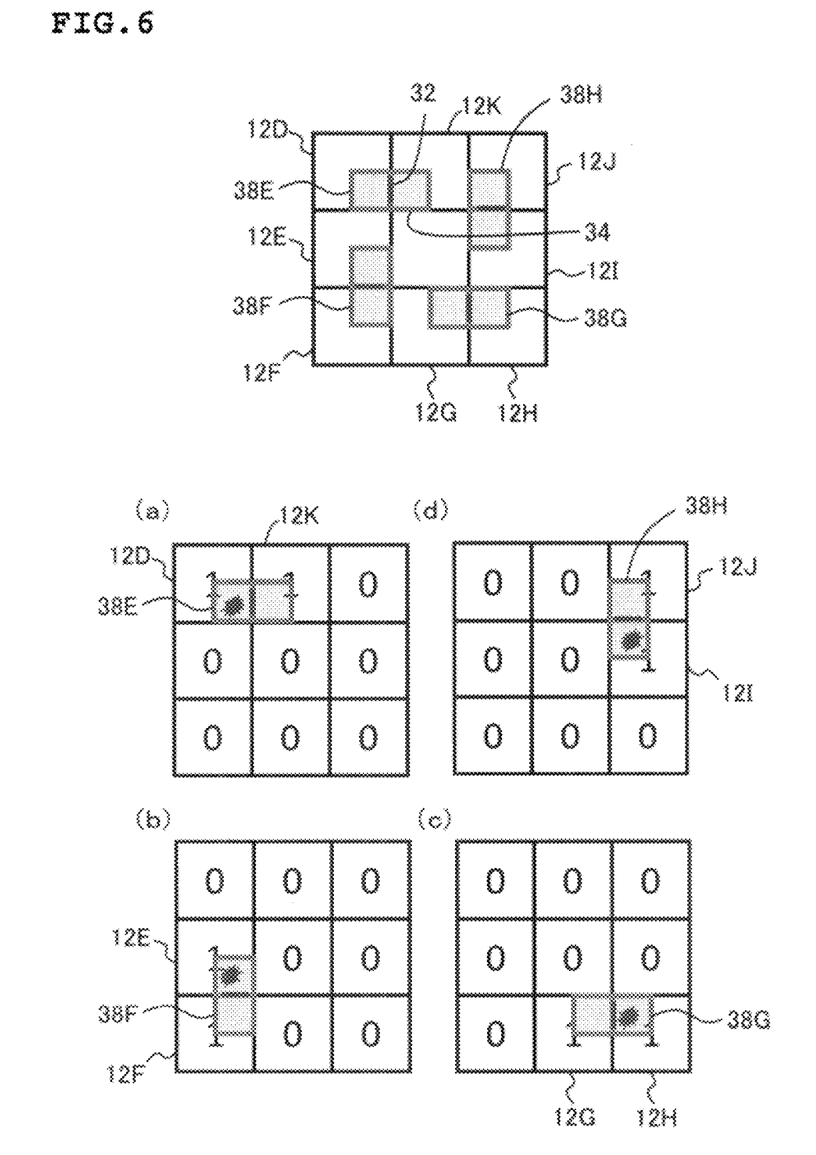
FIG. 6 includes top views illustrating an identification method at end portions according to the embodiment of the present invention.

In a case in which radiation is incident on the peripheral photodetectors 12D to 12K, for which scintillator units are not illustrated in FIG. 5, an incident position can also be identified as illustrated in FIG. 6.

In other words, in a case in which radiation is incident on the left or upper photodetector 12D or 12K (12D in the drawing), as illustrated in (a), the upper left scintillator unit 38E emits light. In a case in which radiation is incident on the left or lower left photodetector 12E or 12F (12E in the drawing), as illustrated in (b), the lower left scintillator unit 38F emits light. In a case in which radiation is incident on the lower or lower right photodetector 12G or 12H (12H in the drawing), as illustrated in (c), the lower right scintillator unit 38G emits light. Also, in a case in which radiation is incident on the right or upper right photodetector 12I or 12J (12I in the drawing), as illustrated in (d), the upper right scintillator unit 38H emits light. Therefore, as in FIG. 5(B), it is sufficient to identify the unit scintillator with a larger output.

Figure 7:
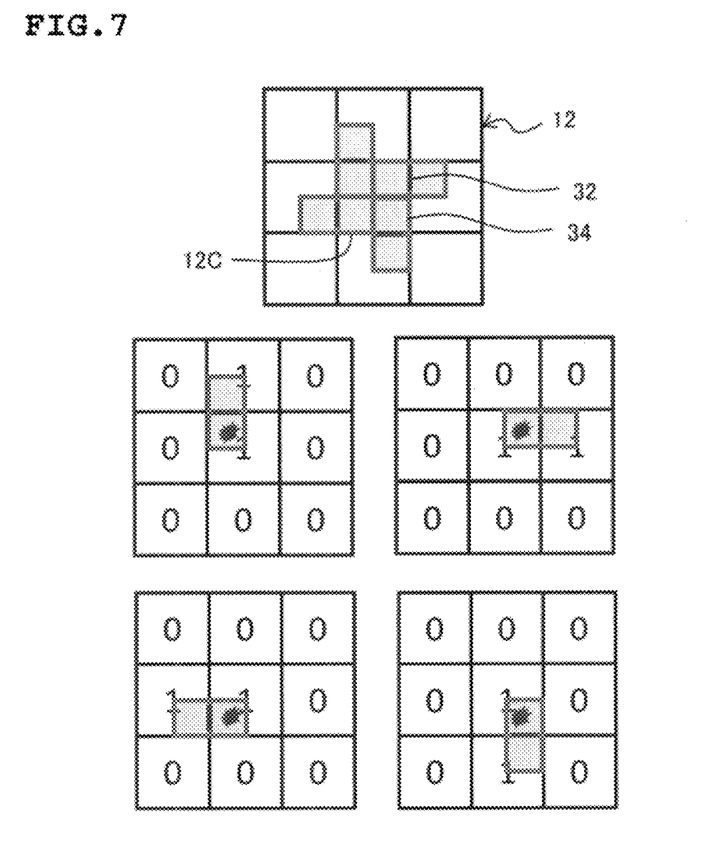
FIG. 7 includes top views illustrating another example of the arrangement pattern of the scintillators relative to the central photodetector according to the embodiment of the present invention.

The arrangements of the scintillators relative to the central photodetector 12C are not limited to FIG. 5, and the scintillators may be arranged as illustrated in FIG. 7.

Figure 8:
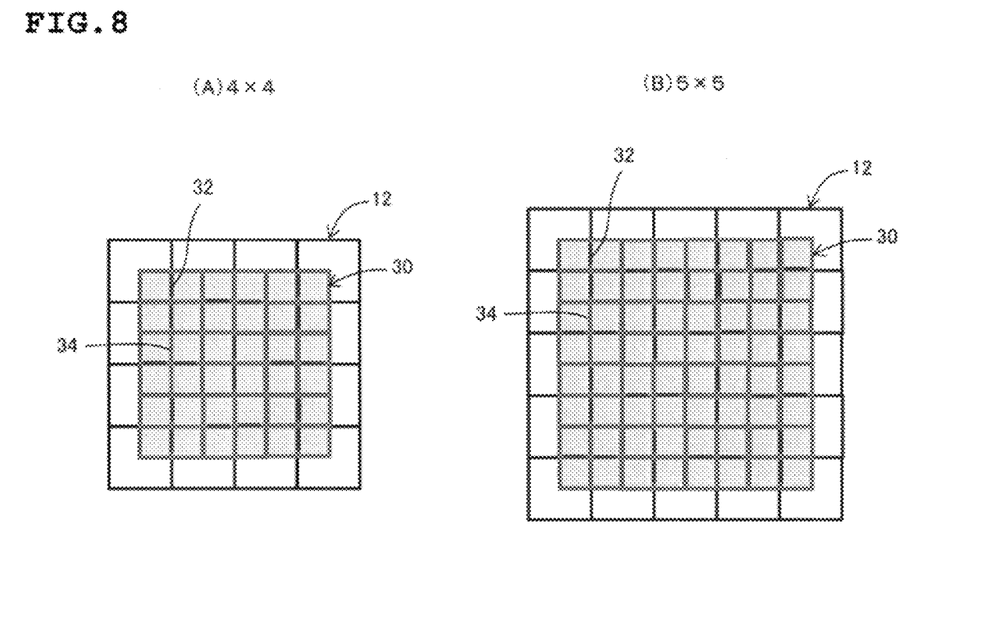
FIG. 8 includes top views illustrating the relationship between the photodetectors and scintillators in the case of (A) 4×4 and (B) 5×5 according to the embodiment of the present invention.

In addition, the number of photodetectors of the photodetector array 12 is not limited to 3×3 as illustrated in FIGS. 4 to 7, but may be 4×4 as illustrated in FIG. 8(A) or 5×5 as illustrated in FIG. 8(B).

Figure 9:
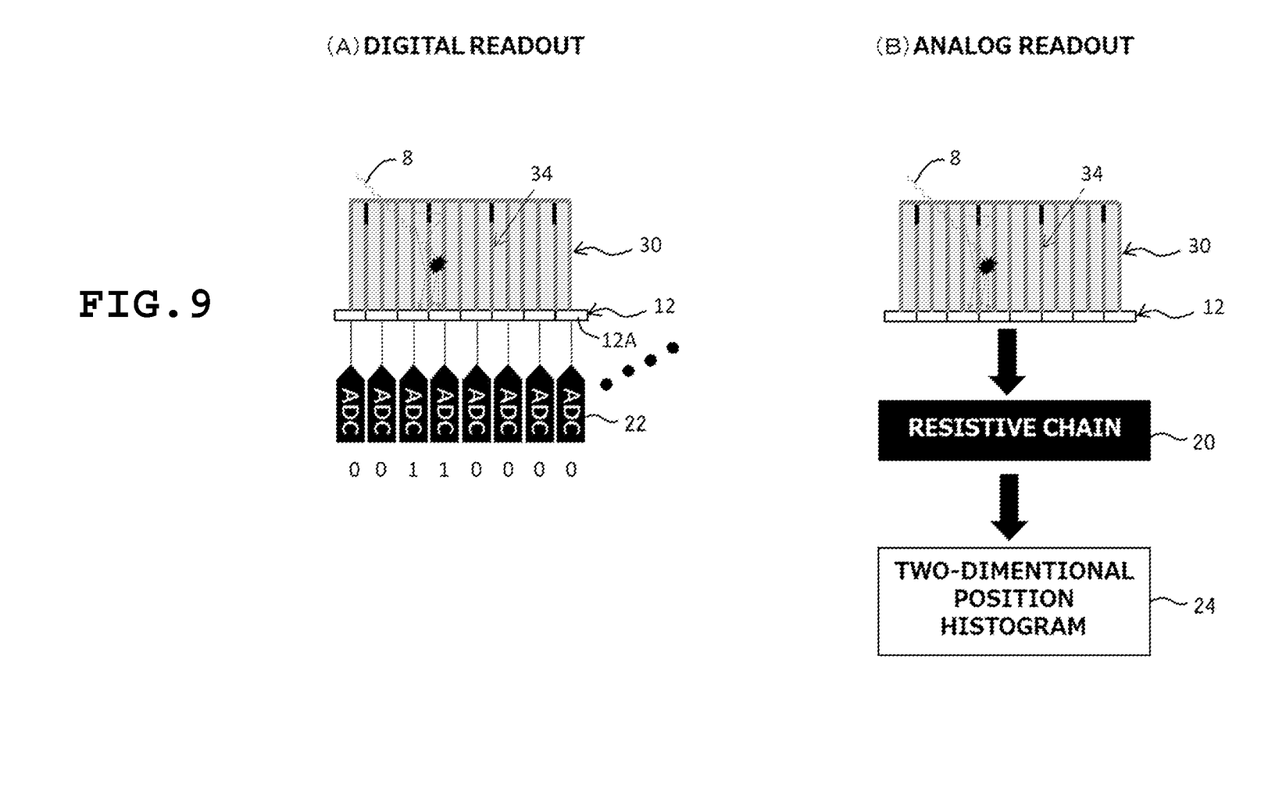
FIG. 9 includes drawings illustrating signal processing methods by (A) a digital readout and (B) an analog readout according to the embodiment of the present invention.

Signal processing used in the present invention may be an independent signal readout (also referred to as a digital readout) in which the ADC 22 is directly connected to each photodetector 12A as illustrated in FIG. 9(A), or an analog readout in which a two-dimensional position histogram 24 is obtained by the anger calculation via a resistor chain 20 as illustrated in FIG. 9(B).

Figure 10:
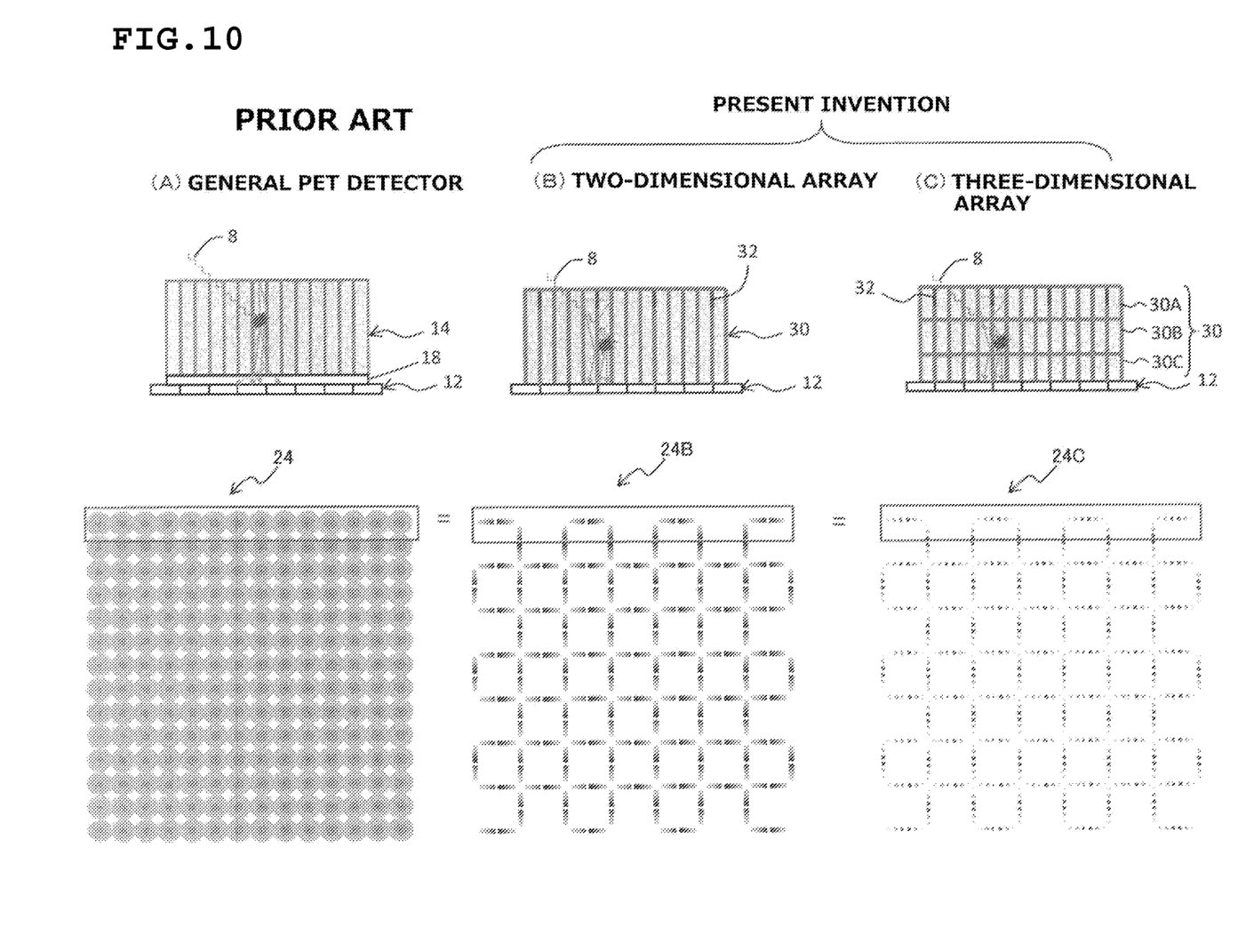
FIG. 10 is a drawing illustrating, in comparison, examples of two-dimensional position histograms of (A) a general PET detector, and (B) a two-dimensional array and (C) a three-dimensional array, according to the present invention.

FIG. 10 illustrates examples of (A) a two-dimensional position histogram 24 of a general PET detector, (B) a two-dimensional position histogram 24B in the case of a two-dimensional array according to the present invention, and (C) a two-dimensional position histogram 24C in the case of a three-dimensional array with three-stage scintillator arrays 30A to 30C according to the present invention in comparison. In the case of the general PET detector as illustrated in FIG. 10 (A), fluctuations due to the number of detected photons occur. In contrast, in the cases of the present invention as illustrated in FIGS. 10 (B) and (C), the scintillator is projected on lines reflecting a detection depth, and the number of points increases with the number of stages of arrays in the depth direction.

Figure 11:
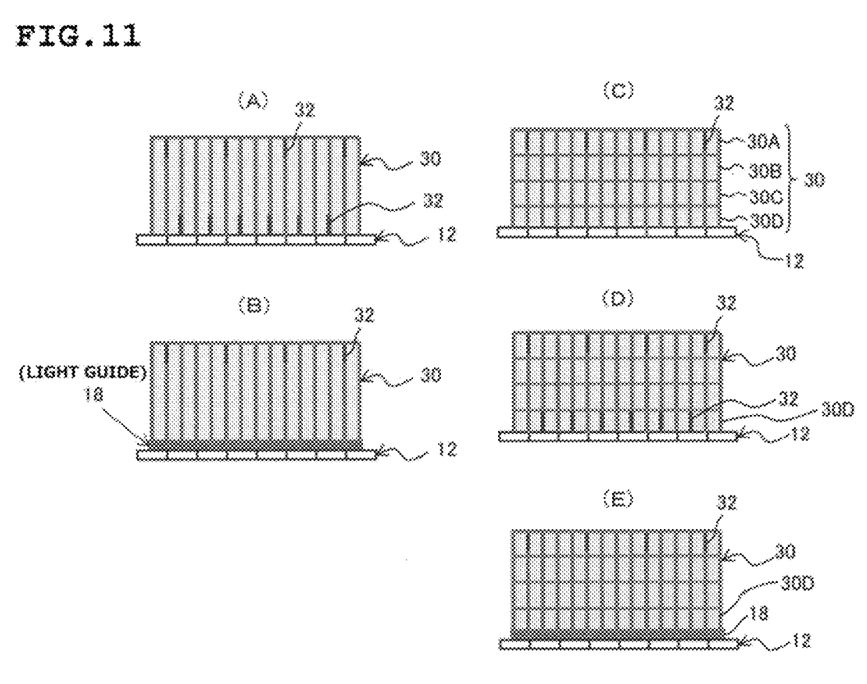
FIG. 11 includes side views illustrating modified examples of the present invention.

In addition, in the above-described embodiments, the scintillator array 30 has one or three stages and the optical adhesive 32 is positioned on the radiation incident side (upper side of the drawing) thereof. However as seen in modified examples illustrated in FIG. 11, as illustrated in (A), the optical adhesive 32 may also be disposed on the side of the photodetector array 12 of the single-stage scintillator array 30 to improve light detection efficiency; as illustrated in (B), a light guide 18 may be inserted between the single-stage scintillator array 30 and the photodetector array 12; as illustrated in (C), the number of stacked stages of the scintillator array 30 may be multiple (the four stages of 30A to 30D in the drawing); as illustrated in (D), the optical adhesive 32 may also be disposed on the scintillator array 30D on the side of the photodetector array 12 in the scintillator array 30 with multiple stages (the four stages of 30A to 30D in the drawing) to improve light detection efficiency; or as illustrated in (E), a light guide 18 may be inserted between the photodetector array 12 and the scintillator array 30 in the scintillator array 30 with multiple stages (the four stages of 30A to 30D in the drawing). The position of the optical adhesive 32, the presence or absence of the light guide 18, and the number of stages of the scintillator array 30 can be set appropriately.

Figure 12:
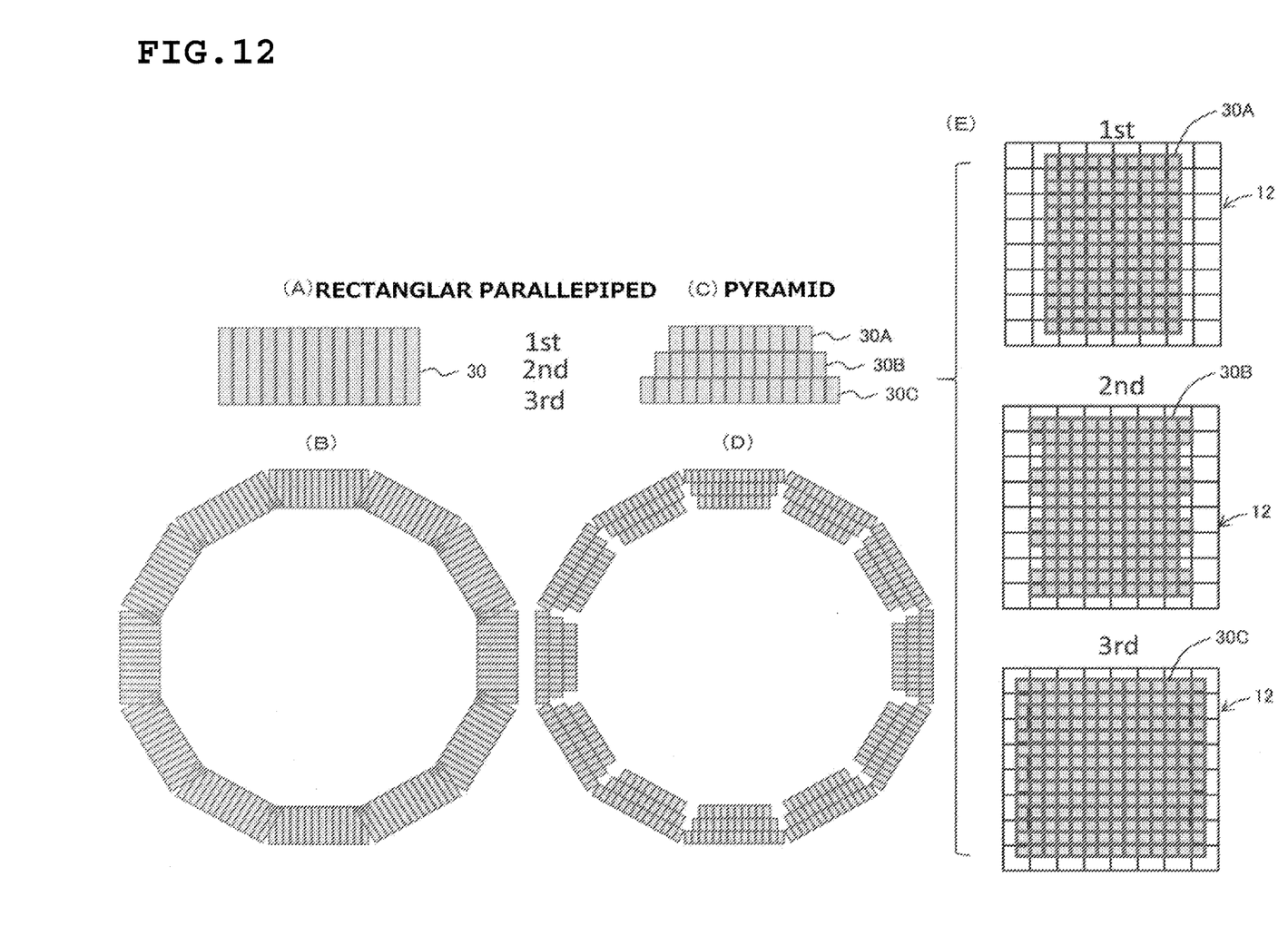
FIG. 12 includes (A) a side view of a rectangular parallelepiped embodiment according to the present invention, (B) a drawing of ring-shaped arrangement of the rectangular parallelepiped embodiments, (C) a side view of a pyramidal embodiment, (D) a drawing of ring-shaped arrangement of the pyramidal embodiments, and (E) drawings illustrating a configuration of each stage.

In addition, in the above-described embodiments, the scintillator array is formed in the shape of a rectangular parallelepiped as illustrated in FIG. 12(A), but in this case, as illustrated in FIG. 12(B), overlapping areas occur in a case in which the scintillator arrays are arranged in a ring shape. On the other hand, as illustrated in FIG. 12(C), in a case in which a scintillator array has multiple stages (three stages of 30A to 30C in the drawing) and the number of scintillators is reduced on the radiation incident side to form a staircase-shaped pyramid, as illustrated in FIG. 12(D), the scintillators can be arranged in a ring shape without any gaps, thus improving its solid angle. FIG. 12(E) illustrates an example of a configuration for each of stages 30A to 30C in the scintillator array.

Figure 13:
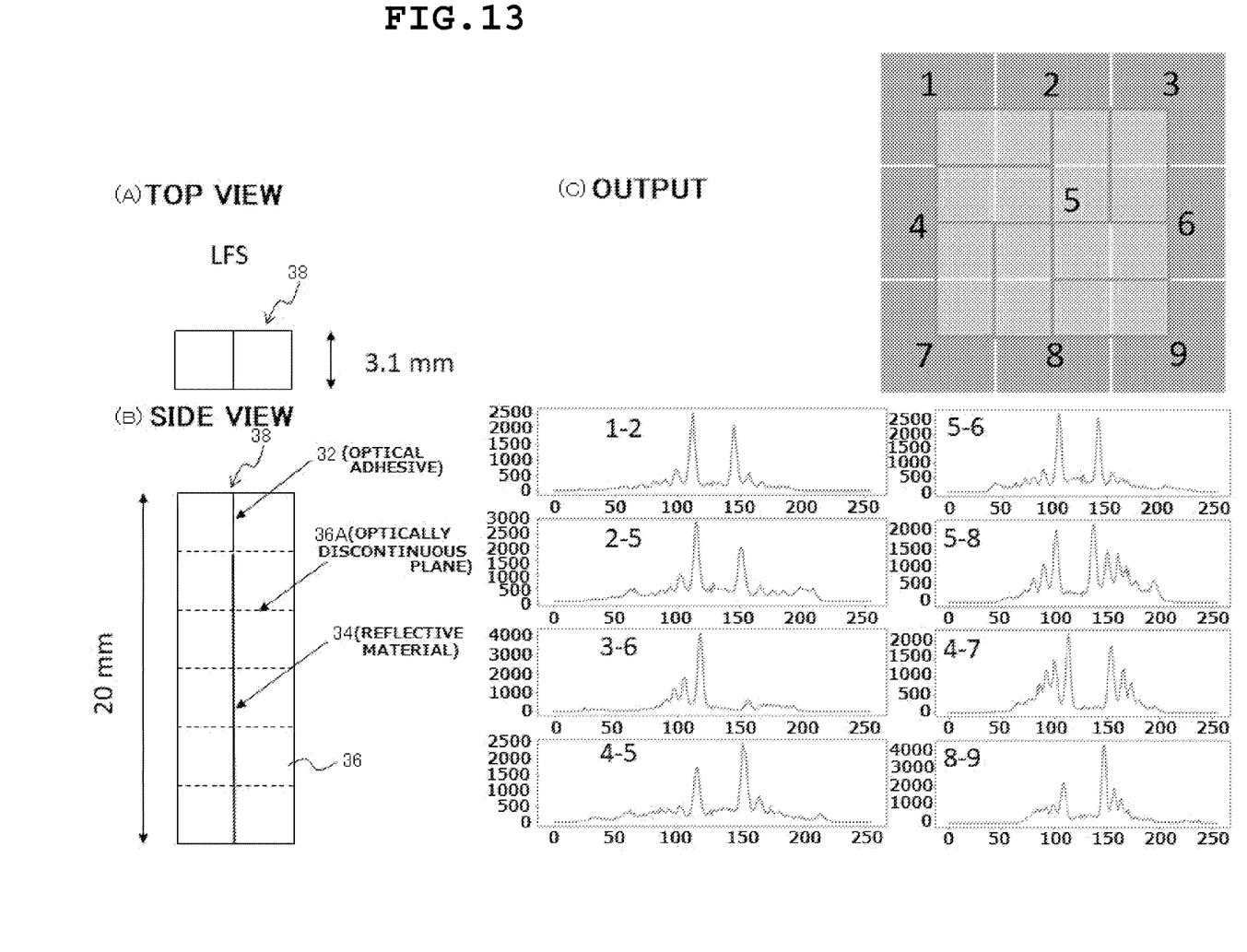
FIG. 13 includes drawings illustrating Example 1 of signal processing in digital arithmetic.

FIG. 13 illustrates Example 1 of a signal in digital processing when using a 3.1×3.1×20 mm LFS unit scintillator 36. In the drawing, reference numeral 36A indicates an optically discontinuous plane provided in the unit scintillator 36 by a laser, for example.

It can be identified that, across the center, radiation is incident on the side of a unit scintillator 1 in the 1-2 scintillator unit example, on the side of 2 in the 2-5 example, on the side of 3 in the 3-6 example, on the side of 5 in the 4-5 example, on the side of 5 in the 5-6 example, on the side of 8 in the 5-8 example, on the side of 4 in the 4-7 example, and on the side of 9 in the 8-9 example.

Figure 14:
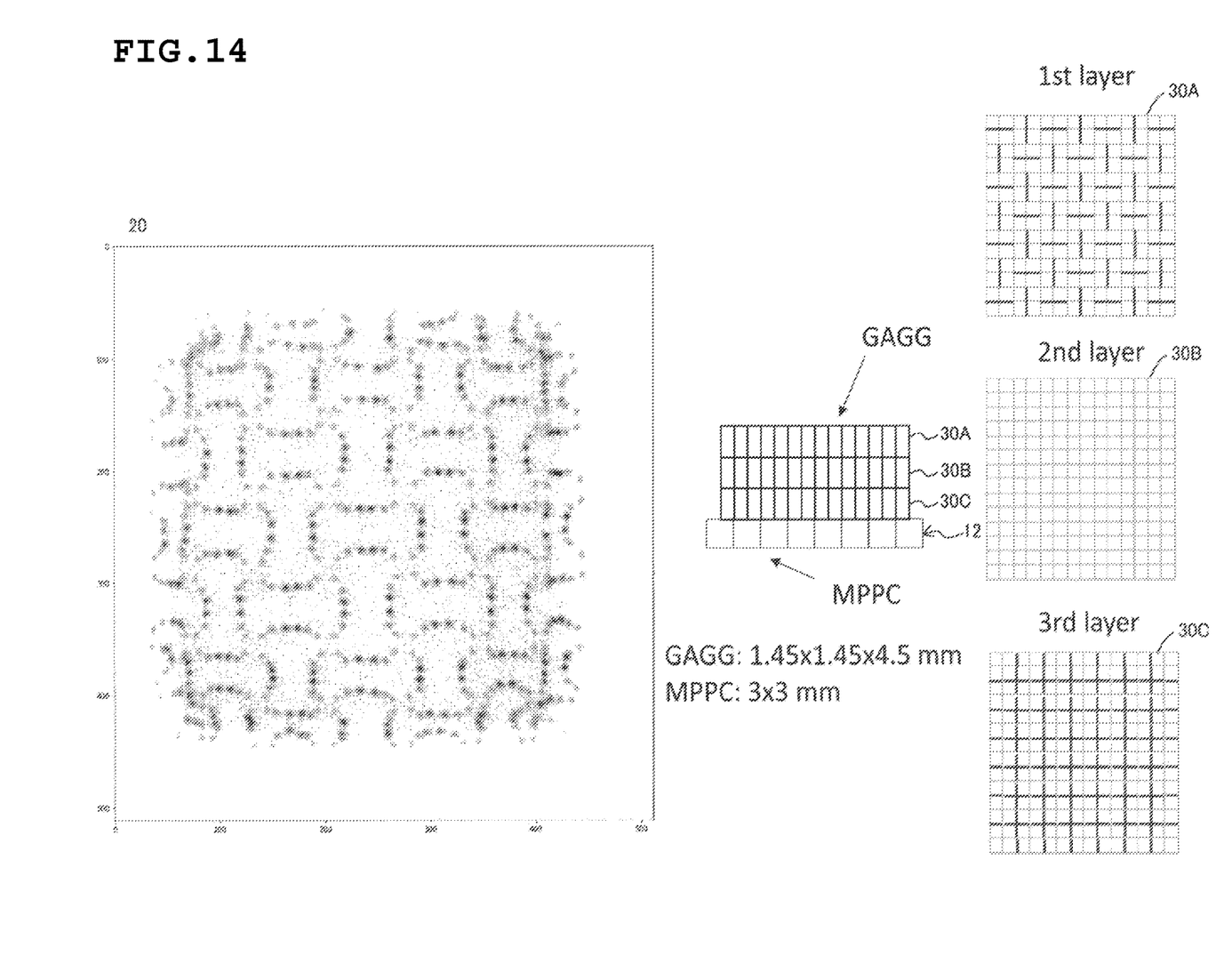
FIG. 14 includes drawings illustrating Example 2 of three layers in the case of adding anger calculation.
Figure 15:
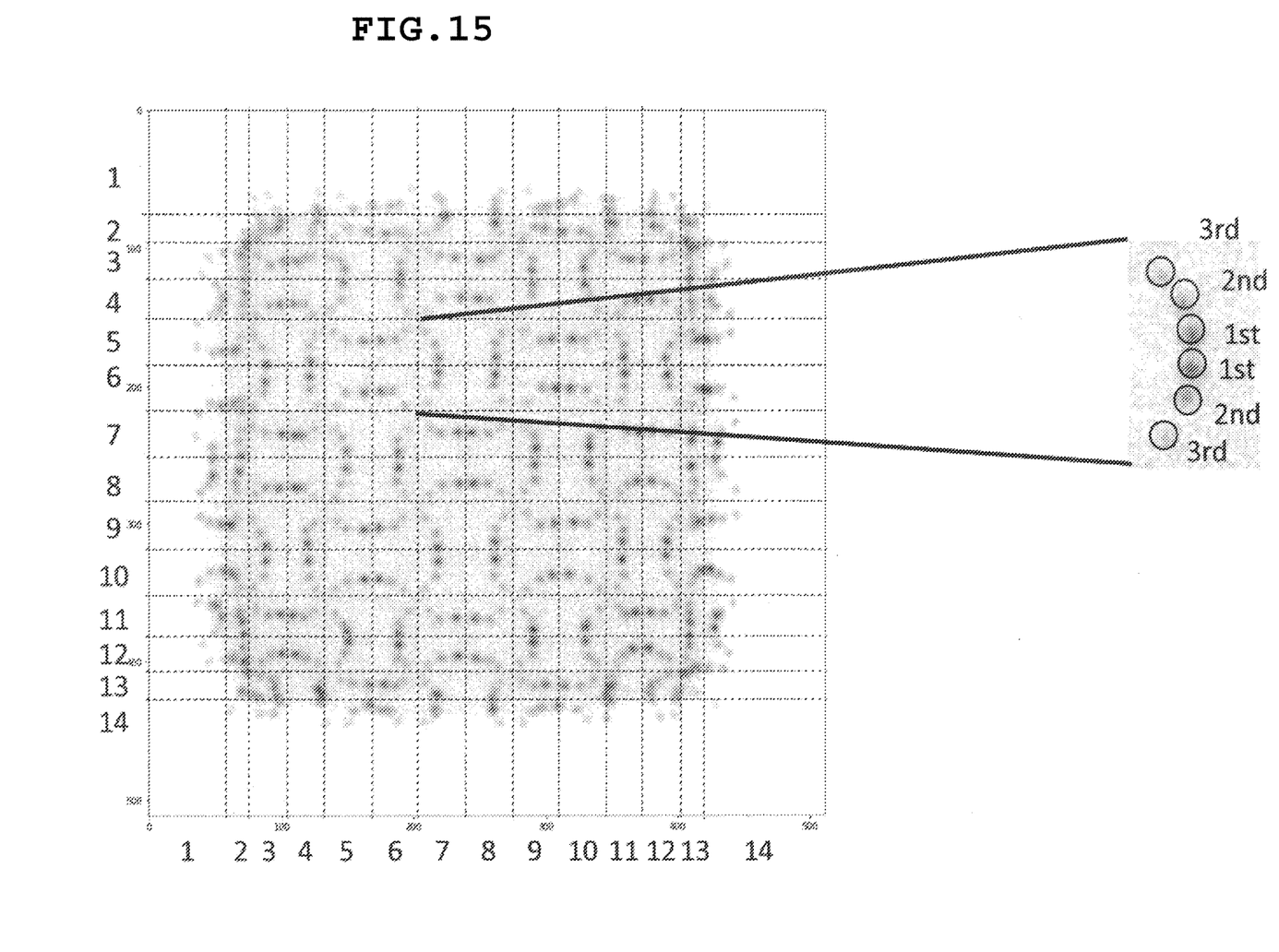
FIG. 15 is an enlarged view of Example 2.

FIG. 14 illustrates Example 2 of a two-dimensional position histogram, in the case of performing anger calculations in three layers using a 1.45×1.45×4.5 mm GAGG unit scintillator and a 3×3 mm MPPC photodetector array. As seen enlarged in FIG. 15, it is obvious that the points on a line can be separated.

Figure 16:
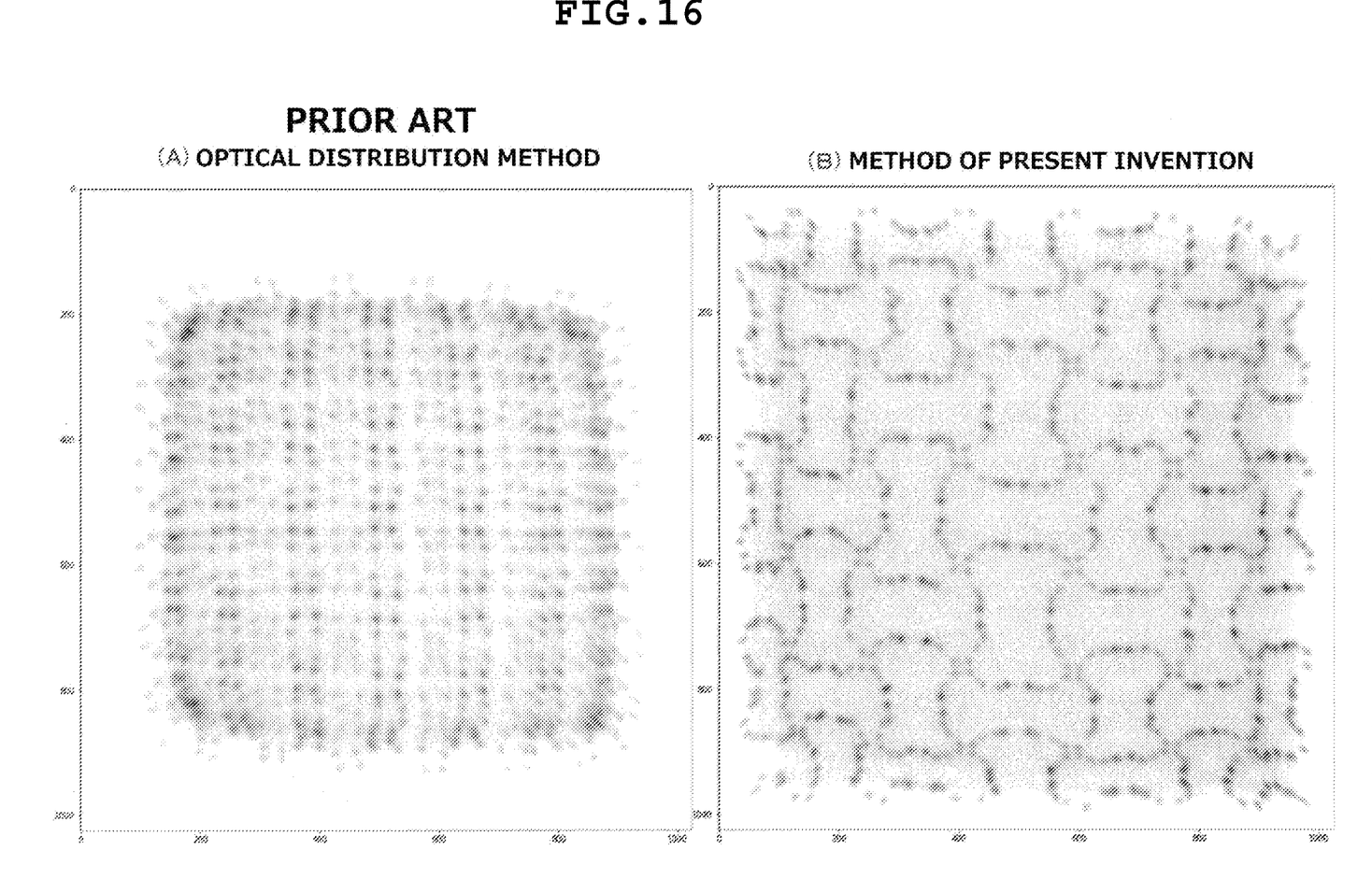
FIG. 16 includes top views illustrating, in comparison, two-dimensional position histograms in a four-layer anger calculation by (A) a conventional optical distribution method and (B) Example 3 using a method of the present invention.

FIG. 16 illustrates, two-dimensional position histograms of (A) an optical distribution method described in Patent Literature 4 and (B) for Example 3 in a method according to the present invention, in a case in which the anger calculation is also performed with a four-layer GAGG scintillator array in comparison. The two-dimensional position histogram is wider than that of the optical distribution method described in Patent Literature 4, so that it is obvious that discrimination performance is improved.

In a human brain PET system such as a helmet-type PET system or a PET system for small animals proposed by the applicant, a higher resolution is required compared to a whole-body PET for cancer. However, according to the present invention, an existing resolution of, for example, 4 mm can be improved to 2 mm, which is half of the existing resolution, without incurring a large cost, while furthermore enabling depth detection.

In the above-described embodiment, the present invention is applied to a three-dimensional digital PET detector, but the application of the present invention is not limited thereto, and it is obvious that the present invention can also be applied to radiation detectors other than PET.

INDUSTRIAL APPLICABILITY

The present invention is useful for a PET system, especially a brain PET system such as a helmet-type PET system, which requires a higher resolution than a whole-body PET for cancer.

REFERENCE SIGNS LIST

10 PET detector
12 photodetector array
12A, 12C to 12K photodetector
14, 30, 30A to 30D scintillator array
16, 34 reflective material
18 light guide
20 resistive chain
22, 22A analog-to-digital converter (ADC)
24, 24B, 24C two-dimensional position histogram
32 optical adhesive
36 unit scintillator
38, 38A to 38H scintillator unit
40 position evaluation unit

The invention claimed is:

1. A radiation position detector, where a scintillator is optically connected to a light receiving surface of a photodetector, in which a response of a scintillator element detecting radiation is identified on the light receiving surface to obtain a radiation detection position, the radiation position detector comprising:
a photodetector array constituted of unit-sized unit photodetectors arranged on a two-dimensional plane; and
a scintillator array constituted of a plurality of tetragonal scintillator elements optically connected to the photodetector array, wherein scintillator units are each constituted of a pair of unit scintillators whose individual cross-sectional size of plane facing to right receiving surface is ¼ of the size of the unit photodetector, where at least part of which is optically connected on a surface side opposite to the right receiving surface and the rest is isolated with a reflective material, the scintillator units being each arranged so as to be positioned over two of the unit photodetectors in the scintillator array,
wherein the scintillator unit is identified by presence or absence of a signal at each of the photodetectors, and one of the unit scintillators of the scintillator unit is further identified on a basis of a strength of the signal, in a case in which the signal is present, to obtain a two-dimensional radiation detection position.

2. The radiation position detector according to claim 1, wherein the scintillator units are arranged so as to be positioned over the unit photodetector and one of four adjacent photodetectors thereto.

3. The radiation position detector according to claim 1, wherein the radiation position detector is configured to identify a detection depth from an output ratio of the photodetectors corresponding to the scintillator unit.

4. The radiation position detector according to claim 1, wherein the radiation position detector is configured to identify the unit scintillator two dimensionally using anger calculations.

5. The radiation position detector according to claim 1, wherein the unit scintillator is pixelated also in a detection depth direction.

6. The radiation position detector according to claim 5, wherein a plurality of stages of two-dimensional scintillator arrays are provided in the detection depth direction, and the number of scintillator units constituting the two-dimensional scintillator array on a radiation incident side is made smaller than the number of scintillator units constituting the two-dimensional scintillator array on a photodetector array side.

* * * * *